United States Patent

[11] 3,607,885

| [72] | Inventor | Robert A. Dombro |
| | | Chicago, Ill. |
| [21] | Appl. No. | 752,840 |
| [22] | Filed | Aug. 15, 1968 |
| [45] | Patented | Sept. 21, 1971 |
| [73] | Assignee | Universal Oil Products Company |
| | | Des Plaines, Ill. |

[54] PREPARATION OF LACTONES SUCH AS SUBSTITUTED DELTA VALEROLACTONES
9 Claims, No Drawings

| [52] | U.S. Cl. | 260/343.5 |
| [51] | Int. Cl. | C07d 7/06 |
| [50] | Field of Search | 260/343.5 |

[56] References Cited
UNITED STATES PATENTS
2,334,180  11/1943  Elderfield et al. .......... 260/343.5

*Primary Examiner*—Alex Mazel
*Assistant Examiner*—Anne Marie T. Tighe
*Attorneys*—James R. Hoatson and Raymond H. Nelson ABSTRACT: Lactones may be prepared from alcohols by treating said alcohol with methyl alcohol in the presence of an alkaline substance and an oxidizing agent at an elevated temperature to prepare the desired product. Examples of such lactones are dimethyl, diphenyl, dicyclohexyl and di-p-tolyl-delta-valerolactones. These compounds have utility as solvents and as starting monomers in the preparation of polyester formulations, among other uses.

PREPARATION OF LACTONES SUCH AS SUBSTITUTED DELTA VALEROLACTONES

This invention relates to a process for preparing lactones, and particularly to a process for treating an alcohol of a type hereinafter set forth in greater detail at an elevated temperature with methyl alcohol to prepare the desired product.

The compounds which are prepared according to the novel process of the present invention comprise lactones, and preferably alkyl-substituted lactones. The compounds which are thus prepared will find a wide variety of uses in the chemical industry. For example, the lactone per se may be utilized as a solvent for various plastic compounds. In addition, the lactone may be used as a starting material or monomer in the preparation of polyester formulations. For example, an illustration of this is the condensation of glycerin plus an alkyl-substituted lactone to give a specific type of polyester resin. It is also contemplated that other polyols such as glycols or other triols may also be utilized as a starting material to be condensed with the lactones to form the desired resin. Yet another use for the various lactones which may be prepared according to the process is as a component in fragrances and aroma compositions of matter which are later used in soaps, cosmetics, detergents, talcs, etc.

It is therefore an object of this invention to provide a novel process for preparing lactones.

A further object of this invention is to prepare lactones utilizing an alcohol as the starting material, said alcohol being treated in a manner hereinafter set forth in greater detail.

In one aspect an embodiment of this invention resides in a process for the preparation of a lactone which comprises treating an alcohol with methyl alcohol in the presence of an alkaline substance and an oxidizing agent at a temperature in the range of from about 100° to about 300° C., and recovering the resultant lactone.

A specific embodiment of this invention is found in a process which comprises treating n-propyl alcohol with methyl alcohol in the presence of sodium hydroxide and dimethyl sulfoxide at a temperature in the range of from about 100° C. to about 300° C. and recovering the resultant dimethyl-δ-valerolactone.

Other objects and embodiments will be found in the following further detailed description of the present invention.

As hereinbefore set forth, the present invention is concerned with a process for preparing lactones and preferably alkyl-substituted δ-valerolactones. The desired compounds are prepared by treating an alcohol of the type possessing the generic formula:

RCH$_2$CH$_2$OH in which R may be selected from the group consisting of hydrogen, alkyl, alkenyl, cycloalkyl, cycloalkenyl, aryl, aralkyl, alkaryl, alkaralkyl, nitrile and amino radicals. Specific examples of these alcohols will include ethyl alcohol, n-propyl alcohol, n-butyl alcohol, n-amyl alcohol, isoamyl alcohol, n-hexyl alcohol, 3-methylpentanol, n-heptyl alcohol, 3-butenyl alcohol, 4-pentenyl alcohol, 5-hexenyl alcohol, 6-heptenyl alcohol, 2-cyclopentylethyl alcohol, 2-cyclohexylethyl alcohol, 2-cycloheptylethyl alcohol, 2-cyclopentenylethyl alcohol, 2-cyclohexenylethyl alcohol, 2-phenylethyl alcohol, 2-p-tolylethyl alcohol, 2-aminoethyl alcohol, 2-cyanoethyl alcohol, 3-cyclopentylpropyl alcohol, 3-cyclohexylpropyl alcohol, 3-cycloheptylpropyl alcohol, 3-cyclopentenylpropyl alcohol, 3-cyclo-hexenylpropyl alcohol, 3-phenylpropyl alcohol, 3-p-tolylpropyl alcohol, 3-aminopropyl alcohol, etc. It is to be understood that the aforementioned alcohols are only representative of the class of compounds which may be used, and that the present invention is not necessarily limited thereto.

The aforementioned alcohols are treated with methyl alcohol in the presence of an alkali substance, an oxidizing agent and a solvent to form the desired lactone. Examples of oxidizing agents which are suitable for use in the process of the present invention will include hydrogen peroxide, air, oxygen, alkali or alkaline earth metal hypochlorites such as sodium hypochlorite, potassium hypochlorite, lithium hypochlorite, calcium hypochlorite, magnesium hypochlorite, etc. dialkyl sulfoxides such as dimethyl sulfoxide, diethyl sulfoxide, dipropyl sulfoxide, or any other oxidizing agent which is essentially stable in the alkaline medium but which produces the desired effect at reaction condition. Polar solvents which may be used comprise, in the preferred process of this invention, the lower molecular weight alcohols such as methyl alcohol (also a reactant), isopropyl alcohol, t-butyl alcohol, etc., the preferred alcohol being methyl alcohol. It is also contemplated that cosolvents may also be used such as water, acetone, acetonitrile, etc., the preferred cosolvent being water.

The reaction is preferably effected at elevated temperatures ranging from about 100° up to about 300° C. or more and preferably in a range of from about 150° to about 300° C. Operating pressures for the process of this invention will range from atmospheric up to about 100 atmospheres or more, the desired pressure being that which is sufficient to maintain a major portion of the reactants in the liquid phase. If superatmospheric pressures are to be used, said pressure is provided for by introducing an inert gas such as nitrogen into the reaction mixture.

In addition to the aforementioned compounds which are present in the reaction mixture, the reaction is effected in an alkaline medium, the alkalinity being provided for by the use of an alkali substance which includes alkali metal hydroxides such as potassium hydroxide, sodium hydroxide, lithium hydroxide, or the alkaline earth metal hydroxides such as calcium hydroxide, magnesium hydroxide, etc. It is contemplated that any other alkali metal or alkaline earth metal salts thereof which will provide an alkaline medium may also be utilized, although not necessarily with equivalent results.

The process of the present invention may be effected in any suitable manner and may comprise either a batch or continuous type operation. For example, when a batch type operation is used, a quantity of the alcohol reactants of the type hereinbefore set forth is charged to an appropriate apparatus such as, for example, a rotating autoclave. The autoclave will also contain the alkali substance, the oxidizing agent, and the polar solvent such as methyl alcohol. In addition, if so desired, a cosolvent such as water may also be present in the reaction mixture. The autoclave is sealed and heated to the desired operating temperature. In the event that superatmospheric pressure is to be used, an inert gas such as nitrogen is also charged to the reactor to maintain the desired pressure. The components of the reaction mixture will usually be present in amounts of from about two moles of the alcohol which is to be converted to the desired lactone, about one mole of methyl alcohol, about three moles of the oxidizing agent, and enough alcohol and/or cosolvent to maintain the reactants in solution at reaction temperature. In addition, the alkali substance will also be present in a ratio of about two moles of alkali metal compound or one mole of alkaline earth metal compound per mole of the alcohol which is to be converted to the desired lactone. Upon completion of the desired residence time, the autoclave and contents thereof are cooled to room temperature, the excess pressure, if any, is vented and the reaction mixture is recovered. This mixture is acidified and then subjected to conventional means of separation whereby the desired lactone is recovered from any unreacted starting materials.

It is also contemplated within the scope of this invention that the process described herein may be effected in a continual manner of operation. When such a type of operation is used, a quantity of the alcohol is continuously charged to a reaction zone which is maintained at the proper operating conditions of temperature and pressure. In addition, the oxidizing agent, methyl alcohol, and a cosolvent containing the alkali substance are also continuously charged to the reactor through separate lines. Alternatively, if so desired, the oxidizing agent and solvent may be combined prior to entry into said reactor and charged thereto in a single stream. Upon completion of the desired residence time, the reactor effluent is continuously withdrawn and subjected to acidification and to a separation step wherein the desired lactone is separated from any unreacted alcohol, oxidizing agent, polar solvent and alkali substance, the latter compounds being recycled to form a portion of the feed stock, while the lactone is subjected to purification steps and charged to storage.

Examples of lactones which may be prepared according to the process of this invention include dimethyl-δ-valerolactone, trimethyl-δ-valerolactone, diethyl-δ-valerolactone, dipropyl-δ-valerolactone, dicyclohexyl-δ-valerolactone, dicycloheptyl-δ-valerolactone, diphenyl-δ-valerolactone, di-o-tolyl-δ-valerolactone, di-m-tolyl-δ-valerolactone, di-p-tolyl-δ-valerolactone, divinyl-δ-valerolactone, dipropenyl-δ-valerolactone, dicyano-δ-valerolactone, etc. It is to be understood that the aforementioned lactones are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

In this example a solution of 1 mole of n-propyl alcohol, 0.5 mole of methyl alcohol, 2.0 mole of sodium hydroxide along with 1.5 mole of dimethyl sulfoxide and 50 grams of water were placed in the glass liner of a rotating autoclave. The autoclave was sealed and 30 atmospheres of nitrogen was pressed in. The autoclave and contents thereof were then heated to a temperature of about 225° C. and maintained thereat for a period of 5 hours. At the end of this time, the apparatus and contents thereof were cooled to room temperature, the excess pressure was discharged and the reaction mixture acidified. The oil which separated was subjected to fractional distillation under reduced pressure. The desired product which comprised α,γ-dimethyl-δ-valerolactone, b.p. 229° C. at atmospheric pressure, n  1.4570, MW=128 by Mass Spectrometer analysis and α,**,γ-trimethyl-δ-valerolactone was separated and recovered. The identification of these compounds was made by means of Infrared, Nuclear Magnetic Resonance Analyses, etc.

EXAMPLE II

A mixture comprising 0.5 mole of 2-phenylethyl alcohol, 0.25 mole of methyl alcohol, 1.0 mole of sodium hydroxide, and 0.75 mole of dimethyl sulfoxide in 50 grams of water is placed in the glass liner of a rotating autoclave. The autoclave is sealed and nitrogen is pressed in until an initial pressure of 40 atmospheres is reached. The autoclave and contents thereof are then heated to a temperature of about 225° C. and maintained thereat for a period of about 5 hours. At the end of this time, the autoclave and contents thereof are allowed to return to room temperature. The excess pressure is discharged and the reaction mixture is recovered. The mixture is then acidified to neutralize the alkali and subjected to separation techniques including fractional distillation under reduced pressure. The desired product comprising diphenyl-δ-valerolactone is recovered therefrom.

EXAMPLE III

A mixture consisting of 1.0 mole of 2-cyclohexylethyl alcohol, 0.5 mole of methyl alcohol, 2.0 mole of sodium hydroxide and 1.5 mole of hydrogen peroxide is dissolved in 50 grams of water. The mixture is placed in the glass liner of a rotating autoclave which is thereafter sealed. Nitrogen is pressed in until an initial pressure of 40 atmospheres is reached and thereafter the autoclave is heated to a temperature of 250° C. The autoclave and contents thereof are maintained at this temperature for a period of about 5 hours after which the autoclave is cooled to room temperature, vented to discharge the excess pressure, and the reaction mixture is recovered therefrom. After acidification to neutralize the alkali, the mixture is subjected to separation techniques including fractional distillation under reduced pressure. The desired product which comprises dicyclohexyl-δ-valerolactone is recovered therefrom.

EXAMPLE IV

In this example a mixture of 1.0 mole of 2-p-tolyl-ethyl alcohol, 0.5 mole of methyl alcohol, 2.0 moles of potassium hydroxide and 1.5 mole of sodium hypochlorite along with 50 grams of acetone is placed in the glass liner of a rotating autoclave. The autoclave is sealed and nitrogen pressed in until an initial pressure of 30 atmospheres is reached. The rotating autoclave is then heated to a temperature of 225° C. and maintained thereat for a period of 5 hours. At the end of this time, the autoclave and contents thereof are allowed to cool to room temperature and the excess pressure is discharged. The autoclave is then opened and the reaction product is recovered therefrom. The product is then treated with acid to neutralize the alkali and the sprung oil is subjected to fractional distillation under reduced pressure, the desired product comprising di-p-tolyl-δ-valerolactone being recovered therefrom.

I claim:

1. A process for the preparation of a lactone which comprises treating an alcohol of at least 2 carbon atoms per molecule with methyl alcohol at a temperature of from about 100° to about 300° C. in the presence of an alkali substance and an oxidizing agent, said alcohol of at least 2 carbon atoms having the generic formula:

$$RCH_2CH_2OH$$

in which R is selected from the group consisting of hydrogen, alkyl and alkenyl radicals of from 1 to 5 carbon atoms, cycloalkyls of from 5 to 7 carbon atoms, cycloalkenyls of from 5 to 6 carbon atoms, and phenyl, tolyl, amino, cyano, cyclopentylpropyl, cyclohexylpropyl, cyclohexenylpropyl, phenylpropyl, tolylpropyl and aminopropyl radicals; said alkali substance being selected from the group consisting of alkali metal and alkaline earth metal hydroxides and salts; and said oxidizing agent being selected from the group consisting of hydrogen peroxide, air, oxygen, alkali and alkaline earth metal hypochlorites and dialkyl sulfoxides.

2. The process of claim 1 further characterized in that said alcohol of at least 2 carbon atoms is n-propyl alcohol, said alkali substance is sodium hydroxide, said oxidizing agent is dimethyl sulfoxide and said temperature is about 225° C.

3. The process of claim 1 further characterized in that said alcohol of at least 2 carbon atoms is 2-phenylethyl alcohol, said alkali substance is sodium hydroxide, said oxidizing agent is dimethyl sulfoxide and said temperature is about 225° C.

4. The process of claim 1 further characterized in that said alcohol of at least 2 carbon atoms is 2-cyclohexylethyl alcohol, said alkali substance is sodium hydroxide, said oxidizing agent is hydrogen peroxide and said temperature is about 250° C.

5. The process of claim 1 further characterized in that said alcohol of at least 2 carbon atoms is 2-p-tolyl-ethyl alcohol, said alkali substance is potassium hydroxide, said oxidizing agent is sodium hypochlorite and said temperature is about 225° C.

6. The process as set forth in claim 1 in which said alcohol is n-propyl alcohol and said lactone is a dimethyl-δ-valerolactone.

7. The process as set forth in claim 1 in which said alcohol is 2-phenylethyl alcohol and said lactone is a diphenyl-δ-valerolactone.

8. The process as set forth in claim 1 in which said alcohol is 2-cyclohexylethyl alcohol and said lactone is a dicyclohexyl-δ-valerolactone.

9. The process as set forth in claim 1 in which said alcohol is 2-p-tolylethyl alcohol and said lactone is a di-p-tolyδ-valerolactone.